United States Patent

[11] 3,573,439

[72] Inventors Ronald G. Myers
Parsippany, N.J.;
Harvey Bidner, Plainview, N.Y.; Reinholdt J. Eufinger, Jr., Morris Plains, N.J.

[21] Appl. No. 725,666
[22] Filed May 1, 1968
[45] Patented Apr. 6, 1971
[73] Assignee Monsanto Company
St. Louis, Mo.

[54] HIGH SPEED QUINARY COUNTER
2 Claims, 3 Drawing Figs.

[52] U.S. Cl. .......... 235/92, 340/347, 328/46
[51] Int. Cl. .......... H03k 23/24
[50] Field of Search .......... 235/92, (60, 96, 92); 340/347

[56] References Cited
UNITED STATES PATENTS

| | | | |
|---|---|---|---|
| 2,853,238 | 9/1958 | Johnson .......... | 235/92 |
| 3,407,288 | 10/1968 | Reiser .......... | 235/92 |

*Primary Examiner*—Maynard R. Wilbur
*Assistant Examiner*—Joseph M. Thesz, Jr.
*Attorneys*—John D. Upham, Herman O. Bauermeister and Harold R. Patton

ABSTRACT: A quinary counting circuit consisting of three J-K flip-flops which are interconnected in a manner such that the flip-flop to which all pulses to be counted are applied is inhibited by a pulse occurring prior to the fourth pulse to be counted. In this manner the effect of the propogation delays of the individual J-K flip-flops on the speed of the quinary circuit is minimized.

FIG. 1
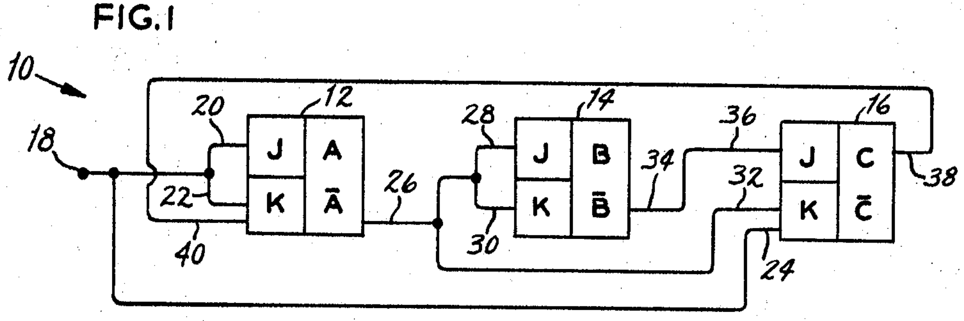
FIG. 3
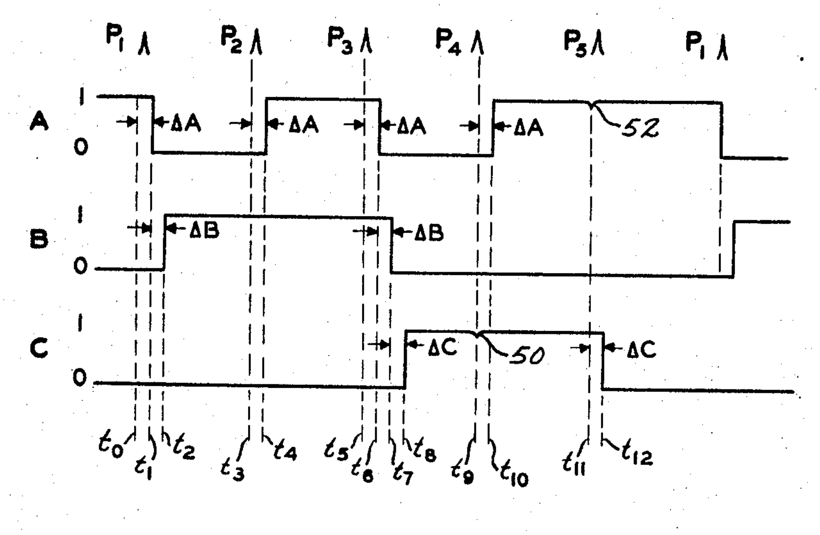
FIG. 2
| P | A | B | C |
|---|---|---|---|
| 0 | 1 | 0 | 0 |
| 1 | 0 | 1 | 0 |
| 2 | 1 | 1 | 0 |
| 3 | 0 | 0 | 1 |
| 4 | 1 | 0 | 1 |
| 5/0 | 1 | 0 | 0 |
INVENTORS
RONALD G. MYERS
HARVEY BIDNER
REINHOLDT J. EUFINGER, JR.
BY Harold R. Patton
ATTORNEY

HIGH SPEED QUINARY COUNTER

FIELD OF THE INVENTION

The present invention relates generally to counter and divider circuits, and more particularly to a high-speed quinary counter and divider circuit, i.e., a counting circuit which provides a count of up to 5 or a dividing circuit which divides by a factor of 5.

In the field dealing with the design of digital time and frequency measuring instruments, for example countertimers and the like, it is highly desirable to provide decade (count or divide by 10) counting circuits which are operable at high speeds; for example, in excess of 100 MHz. (100 million cycles per second). In many instances, such decade circuits consist of a biquinary configuration, i.e., a flip-flop (divide or count by 2) circuit connected to drive a quinary circuit.

DESCRIPTION OF THE PRIOR ART

Heretofore, one of the limiting factors in achieving high speed, integrated circuit biquinary counters has been the limitation of the quinary circuit speed. This limitation is in part imposed by the propagation delay (time lag between the application of a signal and its response) of the bistable elements (flip-flops) which comprise the quinary circuit.

For example, conventional quinary circuits consisting of three bistable elements employ a feedback signal from the output of one bistable element to the input of another in order to eliminate three of the possible eight combinations of binary codes that might be obtained. Ordinarily, the inhibiting feedback signal is generated by allowing the fourth clock pulse of a counting sequence to toggle one bistable element which in turn triggers a second bistable element. The second bistable element then provides an output which inhibits the triggering bistable element during the fifth clock pulse. The fifth pulse then removes the inhibiting feedback signal and the circuit is ready to initiate another counting or dividing sequence of 5. In order to carry out the inhibiting function just described, at least two propagation delays must occur between the fourth and fifth pulse, i.e., the propagation delay of both the triggering bistable element and the bistable element providing the inhibiting signal.

The general purpose of this invention is to provide a quinary circuit for high speed counting or dividing applications which embraces all the advantages of similarly employed binary circuits, yet does not possess the disadvantage of reduced speed of operation because of the aforedescribed propagation delay of bistable elements comprising the quinary circuit. To attain this, the present invention utilizes a unique interconnection between the bistable elements of the quinary circuit, such that the one bistable element of the quinary circuit has an inhibiting signal applied to it as a result of a pulse occurring prior to the fourth such pulse.

In this manner, the time between the fourth and fifth clock pulses can be made less than the sum of the limiting propagation delay times for the triggering and inhibiting bistable elements. This allows for a substantially increased pulse repetition rate and resulting higher frequency limitation for the binary circuit.

Broadly the digital quinary circuit of the present invention includes a plurality of flip-flop stages connected in a quinary mode. The flip-flops are the so-called J-K type, later to be more specifically identified, interconnected to minimize the effect of the propagation delays of the individual flip-flops on the overall speed of the quinary circuit.

BACKGROUND OF THE INVENTION

It should be noted that the terms "divider" and "counter" are merely names given to applications of the unique quinary logic device of the invention. The quinary device registers a unique pattern or binary code of l's and O's or SET's and RESET's for each digit from 0 to 5 and repeats itself beginning after every fifth input pulse. In the quinary device of the present invention, as will be more fully explained hereafter, at least one of the output terminals of one of the flip-flops produces an output pulse only once for every five input pulses applied to the quinary device. Consequently, if that output terminal is used as the output terminal of the quinary device, the device acts as a divide-by-5 circuit. Furthermore, if the quinary device is preceded by a "bi" or conventional flip-flop stage and driven thereby, the combination circuit becomes a biquinary or divide-by-10 circuit. Such application of a "bi" stage is well known, and therefore for purposes of clarity, it will not be described in detail.

For the purposes of the specification and claims, a flip-flop or bistable element may be defined as one having two states of equilibrium, K (RESET) and J (SET) inputs and complementary outputs, respectively. It should be noted that in some publications the K (RESET) input is often referred to as the CLEAR input. The term RESET will be used throughout this specification for purposes of clarity. The complementary outputs assume static signal states (1 or 0) depending upon the signals presented to the J or K inputs of the respective flip-flops.

Examples of the so-called J–K flip-flops are described in pages 1 through 6 of "MECL 70 MHz. J–K Flip-Flop," Application Note—280, Motorola Semiconductor Products Inc., prepared by Lane Garrett.

As explained in the above-mentioned publication a J–K flip-flop of the type employed in the present invention has the logic shown in the table below:

| Input | | Output |
|---|---|---|
| $J_D$ | $K_D$ | $Q^{N+1}$ |
| 0 | 0 | $Q^N$ |
| 0 | 1 | 0 |
| 1 | 0 | 1 |
| 1 | 1 | $Q^N$ |

The symbols $J_D$ and $K_D$ refer to dynamic, positive-going (from 0 to 1) signal transitions and correspond to the logic representation of 1. As will be more fully described hereinafter, the J–K flip-flops employed in the present invention have a plurality of K-input terminals. A 1 static level signal on one of the K-input terminals inhibits a $K_D$ signal from RESETTING the flip-flop, but does not prevent a $J_D$ signal from SETTING the flip-flop.

An object of the present invention is to the provision of a novel quinary circuit, which lends itself to high-speed random event counting or dividing, as the case may be.

Another object is to provide a quinary counter and divider circuit adapted for use with simple, reliable, inexpensive bistable elements.

A further object of the present invention is the provision of a high-speed quinary counter circuit utilizing a feedback circuit which minimizes the effect of the propagation delays of its bistable elements on the overall speed or upper frequency limitation of the circuit.

SUMMARY OF THE INVENTION

These purposes (as well as others apparent herein) are achieved generally by providing first, second and third bistable elements of the J–K type interconnected in an arrangement in which a first bistable element has an inhibiting signal applied to it by means of the third bistable element in response to the third input pulse of a five pulse counting sequence. The first bistable element has its output connected to the input of the third bistable element so that it prevents the fourth pulse from causing the third bistable element to disengage the inhibiting signal, but causes the fifth pulse to do so.

Utilization of the invention will become apparent to those skilled in the art from the disclosures made in the following description of a preferred embodiment of the invention as illustrated in the accompanying drawings, in which:

BRIEF DESCRIPTION OF THE DRAWINGS

FIG. 1 is a schematic circuit diagram of a preferred embodiment of the quinary circuit of the present invention;

FIG. 2 is a truth table illustrating the binary coded counting sequence of the quinary circuit of FIG. 1; and FIG. 3 is a graphical representation of the input pulses to the quinary circuit of FIG. 1 and the resulting output waveforms of its bistable elements.

DESCRIPTION OF A PREFERRED EMBODIMENT

Referring now to the drawings, there is shown in FIG. 1 a quinary counting and dividing circuit, generally designated 10. The quinary circuit 10 consists of three J–K flip-flops 12, 14, and 16 of the type described in detail in the "MECL 70 MHz. J–K Flip-Flop" article referred to hereinabove. The flip-flops 12, 14, and 16 each are shown as having J- and K-inputs and complementary outputs A $\bar{A}$, B $\bar{B}$, and C $\bar{C}$, respectively. An input terminal 18, which may be connected to a source of clock pulses P (not shown), is connected to the J- and K-inputs 20, 22 of the J–K flip flop 12. The input terminal 18 is also connected to one (24) of two (24,32) K-inputs of the J–K flip-flop 16.

The $\bar{A}$ output 26 of the J–K flip-flop 12 is connected to the J- and K-inputs 28 and 30, respectively, of the J–K flip-flop 14. In addition, the $\bar{A}$ output 26 is connected to the K-input 32 of the J–K flip-flop 16. The B output 34 of the flip-flop 14 has its output J–K connected to the J-input 36 of the J–K flip-flop 16, while the C-output terminal 38 of the J–K flip-flop 16 is connected to a K-input 40 of the J–K flip-flop 12.

The operation of the quinary circuit 10 may best be illustrated with reference to the truth table of FIG. 2 and the output waveforms A, B and C of the J–K flip-flops 12, 14 and 16, of FIG. 3.

OPERATION

Assuming that the J–K flip-flops 12, 14 and 16 are initially set by some appropriate circuitry (not shown), so that their A, B and C outputs assume the logic levels 1 0 0, shown in FIG. 3 as corresponding to the decimal indication 0. Upon the application of the first "toggle" or clock pulse $P_1$ to the input terminal 18 at time $t_o$, its positive-going, dynamic transition will appear as $J_D$ and $K_D$ signals to the J- and K-inputs of the J–K flip-flop 12. Since the output terminal 38 of the J–K flip-flop 16 feeds back a static signal of logic level 0 to the K-input 40 of the J–K flip-flop 12, clock pulse $P_1$ will cause the J–K flip-flop 12 to change state. That is, the signal level appearing at the output terminal 26 will change from 0 to 1 after a propagation delay $t_1$—$t_0$inherent with the J–K flip-flop 12.

At time $t_0$a positive-going dynamic-transition signal $K_D$ is applied to the input 24 of the flip-flop 16, and at time $t_1$another such signal $K_D$ is applied to input 32 thereof as a result of the 0 to 1 transition at the $\bar{A}$ output 26 of flip-flop 12. Both of these $K_D$ signals have no effect on the flip-flop 16, because it is already in its 0 or RESET state. However, the positive-going dynamic signal $K_D$ occurring at the $\bar{A}$ output 26 of flip-flop 12 is applied to the J-and K-inputs 28 and 30 of flip-flop 14. After a propagation delay $t_2$—$t_1$, *the flip-flop 14 toggles, thereby causing the signal at its $\bar{B}$ output 34 to change from its 1 to its 0 state. The resulting negative-going dynamic signal at output terminal 34 is applied to the J-input 36 of flip-flop 16. However, this negative-going signal is ineffective; it will not change the state of flip-flop 16.*

It may be seen, therefore, that the first clock pulse $P_1$ causes the A, B and C outputs of flip-flops 12, 14 and 16 to assume the binary code 010 corresponding to the decimal 1 (see FIG. 2).

The application of the second clock pulse $P_2$ to inputs 20 and 22 of the flip-flop 12 again causes it to change state in the same manner as that described with reference to the first clock pulse $P_1$ after a delay of $t_4$—$t_3$. The clock pulse $P_2$ is also applied to the K-input 24 of the flip-flop 16 at time $t_3$, and the negative-going dynamic signal from the $\bar{A}$ output 26 of the flip-flop 12 is applied to its K-input at time $t_4$. The negative-going signal is ineffective to RESET the flip-flop 16, and the clock pulse $P_2$ does not affect its state because it is already in the RESET or 0 state.

The negative-going signal (1 to 0) occurring at the $\bar{A}$ output terminal 26 of flip-flop 12 at time $t_4$has no effect on the flip-flop 14, and therefore the signal at its $\bar{B}$ output terminal 34 does not change. Thus, the A, B and C outputs of the flip-flops 12, 14 and 16 assume the binary code 110 corresponding to the decimal 2 as a result of the second clock pulse $P_2$.

The third clock pulse $P_3$ is applied simultaneously to the J–K inputs 20, 22 of the flip-flop 12 and the K-input 24 of the flip-flop 16. As a result the flip-flop 12 again changes as state after a propagation delay of $t_6$—$t_5$ and provides a positive-going, dynamic signal at its $\bar{A}$ output terminal 26. The application of the clock pulse $P_3$ to the K-input 24 of the flip-flop 16 does not affect its state, because it is already in the RESET or 0 state. However, the positive-going signal at the $\bar{A}$ output terminal 26 is applied at time $t_6$ to the J- and K-inputs 28, 30 of the flip-flop 14 and the K-input 32 of the flip-flop 16. This positive-going signal is ineffective at the flip-flop 16 because it is already in its RESET or 0 state. However, it causes the flip-flop 14 to toggle, thereby providing a positive-going dynamic o signal at the J-input 36 of the flip-flop 16 after a propagation delay of $t_7$—$t_6$. This in turn causes the flip-flop 16 to change to its SET or 1 state after a delay of $t_8$—$t_7$.

Thus, as a result of clock pulse $P_3$ at time $t_5$, the A, B and C outputs of the flip-flops 12, 14, and 16 assume the binary code 001 as shown in FIG. 3.

It is important to note that after the third clock pulse $P_3$, a static level 1 is fed back by means of the C output 38 of the flip-flop 16 to the K-input 40 of the flip-flop 12. This signal inhibits the flip-flop 12 from being toggled thereafter to its RESET or 0 state by a positive-going signal $K_D$. That is, it overrides or prevents any dynamic positive-going signal applied to the K-input 22 from RESETTING the flip-flop 12 from its 1 state to its 0 state.

Upon the application of the fourth clock pulse $P_4$ at time $t_9$, a positive-going dynamic signal is applied to the J-input 20 and causes the flip-flop 12 to toggle to its SET or 1 state. This same signal is applied to the K-input 24 of the flip-flop 16 and flip-flop C attempts to return to its RESET or 1 state as indicated by the "glitch" 50 of the C waveform of FIG. 3. However, the static signal 1 applied to the J-input 36 by means of the $\bar{B}$ output of the flip-flop 14 overrides, and the flip-flop 16 is prevented from toggling; it remains in its SET or 1 state. Although the flip-flop 12 has toggled as a result of the fourth clock pulse $P_4$, it presents a negative-going signal to the J–K inputs of the flip-flop 16, and therefore it does not change state.

Thus, as a result of the fourth clock pulse $P_4$, the A, B and C outputs of the flip-flops 12, 14, and 16 assume the binary code 101 corresponding to the decimal 4, as shown in the truth table of FIG. 2.

The fifth clock pulse $P_5$ at time $t_{11}$ is applied simultaneously to the J- and K-inputs 20, 22 of the flip-flop 12 and the K-input 24 of the flip-flop 16. Since a static signal 1 is fed back to the K-terminal 40 of the flip-flop 12 at this time, the clock pulse $P_5$ cannot RESET it, although it may produce a small "glitch" 52 (see FIG. 3). However, the clock pulse $P_5$ causes the flip-flop 16 to RESET after a propagation delay of $t_{12}$—$t_{11}$. This RESETTING of the flip-flop 16 removes the inhibiting static 1 signal from the K-input 40 of the flip-flop 12, thereby releasing it from its RESET-inhibited condition. Since the flip-flop 12 does not toggle in response to the fifth clock pulse $P_5$, the flip-flop 14 does not change state. The resulting binary code for the outputs A, B and C of the flip-flops 12, 14, and 16 is 100 corresponding to the decimal count of 5.

It should be noted that after the occurrence of the fifth clock pulse $P_5$, the quinary circuit 10 has returned to its initial state, i.e., the state prior to the occurrence of the clock pulse $P_1$ and the initiation of the counting sequence. Thus, it is ready to cycle through the five distinct counting states again in response to subsequent clock pulses.

It should be obvious to one skilled in the art that any of the output terminals of the flip-flops 14 and 16 may be used to indicate when five pulses have been counted by the quinary circuit 10, or if the count is stopped at any of its discrete states any conventional decoding scheme may be used to convert the binary code into its corresponding decimal indication.

It should be noted that the flip-flop 12 is inhibited from being RESET in response to the third pulse of any given counting sequence by means of the unique feedback and interconnection of this invention. This has the effect of eliminating the otherwise necessary time interval equivalent to two propagation delays between clock pulses. This enables the clock pulse repetition rate to be increased, thereby resulting in a substantial (approximate doubling) of the quinary circuit speed.

Obviously, many variations and modifications of the present invention are possible in light of the above teachings. It is therefore to be understood that the invention may be practiced than as otherwise specifically claimed.

We claim:

1. A digital counter divider comprising:

first, second and third bistable elements, each of the J-K flip-flop type having SET and RESET inputs, said first and third bistable elements each having at least one SET input and two RESET inputs and said second bistable element having at least one SET input and one RESET input coupled together;

said SET input of said first bistable element being coupled to one of said RESET inputs thereof;

an input terminal; and means interconnecting said input terminal and said bistable elements for providing, in response to any pulse train consisting of five pulses applied to said input terminal, a change in state of only said first and second bistable elements in response to the first pulse, a change in state of a only said first bistable element in response to the second and fourth pulses, a change in state of all of said bistable elements in response to the third pulse and a change in state of only the third bistable element in response to the fifth pulse.

2. A digital counter timer as defined in claim 1 wherein:

said interconnecting means, comprises the RESET output of said first bistable element being connected to the SET and RESET inputs of said second bistable element and one of said RESET inputs of said third bistable element;

the RESET output of said second bistable element being connected to the SET input of said third bistable element;

the SET output of said third bistable element being connected to one of the RESET inputs of said first bistable element; and said input terminal being connected to the other RESET input of said third bistable device.